United States Patent [19]

Lin et al.

[11] Patent Number: 5,140,544

[45] Date of Patent: Aug. 18, 1992

[54] DIVIDE-BY-FIVE DIVIDER

[75] Inventors: Cheun-Song Lin, Taichung; Bor-Chuan Kuo, Hsinchu; Rong-Chung Chen, Taichung Hsien, all of Taiwan

[73] Assignee: Industrial Technology Research Institute, Hsinchu, Taiwan

[21] Appl. No.: 772,498

[22] Filed: Oct. 7, 1991

[51] Int. Cl.$^5$ .............................................. G06F 7/52
[52] U.S. Cl. ................................................. 364/761
[58] Field of Search ....................... 364/761, 764, 703

[56] References Cited

PUBLICATIONS

Li, "Fast Constant Division Routines", IEEE Transactions on Computers, vol. C-34, No. 9, Sep. 1985.

*Primary Examiner*—Long T. Nguyen
*Attorney, Agent, or Firm*—Marmorek, Guttman & Rubenstein

[57] ABSTRACT

A video display system includes a frame buffer includes five sets of one or more video random access memories. An address generator for generating address locations in the frame buffer generates ship select, row select and column select address signals. Because the frame buffer comprises five sets of video random access memories, the generation of the address signals requires divide-by-five operations to be carried out. Accordingly, the address generator includes a unique divide-by-five circuit wherein the division is carried out by a sequence of additions and multiplications. In comparison to conventional systems, the video system of the present invention makes more efficient use of memeory capacity in the frame buffer.

1 Claim, 5 Drawing Sheets

DIVIDE-BY-FIVE DIVIDER

FIELD OF THE INVENTION

The present invention relates to a divide-by-five divider circuit. The divider circuit is especially useful for implementing an address generator for a frame buffer of a graphics system which comprises five sets of VRAMs.

BACKGROUND OF THE INVENTION

A high resolution graphics system is illustrated in FIG. 1. The graphics display system 10 of FIG. 1 comprises the CRT display 12. The pixels that are displayed on the screen of the CRT display 12 are stored in the frame buffer 14. A memory controller circuit 16 is provided for controlling the frame buffer 14. The memory controller includes an address generator 20. The address generator 20 receives the address of a pixel on the screen of the display terminal in terms of an x (horizontal or column) coordinate and a y (vertical or row) coordinate. The address generator 20 outputs a chip select signal, a row address signal, and a column address signal in order to address particular locations in the frame buffer 14.

Pixels at the addressed locations in the frame buffer 14 are transmitted via lines 21 to a CRT controller 22. The CRT controller 22 converts the pixels read from the frame buffer from digital to analog form and combines the pixels with CRT control signals including vertical and horizontal synchronization and blanking signals to form an image on the display 12.

The frame buffer 14 comprises a plurality of video RAMs (VRAMs). Currently available VRAMs are 64K*4, 256K*4 etc., which means there are 64K or 256K addressable memory locations, with each location having four bits.

In an illustrative example, the resolution of the CRT display 12 is 1280*1024. A 1280*1024 display system with a refresh frequency of 67 Hz has a pixel rate as high as 108 MHz. The pixel rate is related to the refresh frequency and may be defined as the rate at which pixels are read from the frame buffer.

The pixel rate reflects the time available to read pixels from the frame buffer and when the pixel rate is 108 MHz, the access time to the frame buffer is 9.5 ns/pixel.

Currently available VRAMs have an access time of about 35 ns/pixel. To achieve an average access time of 9.5 ns/pixel, it is necessary to have at least four sets of one or more VRAMs in order to output four pixels at the same time and reach the speed of 9.5 ns/pixel.

Conventionally, a frame buffer for a 1280*1024 display is formed from eight sets of VRAMs. The reason that eight sets of VRAMs are utilized, is that it is particularly easy to generate the address signals. Illustratively, each of the eight sets of VRAMs comprises one or more 256K*4 VRAMs. Each 256K*4 VRAM has 256K addressable locations which are arranged in 512×512 array. One such VRAM is schematically illustrated in FIG. 2. The VRAM 1 of FIG. 2 is shown as having row addresses (RAS) 0-511 and column addresses (CAS) 0-511.

Thus, to address the frame buffer, it is necessary to generate a chip select signal (CS) which selects the VRAM set, a row address select signal (RAS) which selects a row in the selected VRAM set, and a column address select signal (CAS) which selects a column in the selected row.

In the case where eight sets of VRAMs are utilized to form a frame buffer for a 1280*1024 resolution display, a pixel on the display with the coordinates x and y has the following address in the frame buffer CS = x mod 8
RAS = y/2
$CAS = y_0 256 + x18$ (0 bit of the y coordinate multiplied by 256 added to the result of the x coordinate divided by 8).

These addresses are particularly easy to generate because they only involve division by powers of two which is easily accomplished by shifting an appropriate number of bits to the right.

FIG. 3 shows how the pixels from one row of the display are organized in the eight sets of VRAMs.

As indicated above, each VRAM stores four bits at each address location. However, in many graphics systems each pixel is represented by more than four bits. In this case each of the eight sets contains a plurality of 256K VRAMs connected so that within each set bits from the same pixel are stored at corresponding addresses. For example, in a graphics system with 24 bits per pixel, each of the eight sets of VRAMs contains six VRAMs, each of which stores four bits at each address location. Thus, when a given RAS or CAS are transmitted to one of the VRAM sets 24 bits are read out, four bits from each of the six VRAMs in the set.

The problem with forming a frame buffer from eight sets of VRAMs is that memory capacity is not utilized efficiently. Specifically, the eight sets of VRAMs are only 62.5% full because there are only 1280*1024 pixels and 8*256K address locations. This under-utilization of memory capacity is a very serious problem in graphics system because the memory constitutes a significant fraction of the cost of the overall system.

Another conventional architecture for a frame buffer is to use linear addressing and 64K*4 VRAMs. Specifically, five sets of 64K VRAMs are utilized as shown in FIG. 4. The first pixel up to the $256^{th}$ pixel of each display row is stored in the first set, the $257^{th}$ pixel up to the $512^{th}$ pixel of each row is stored in the second set. The same applies to the rest of the VRAM sets until the $1025^{th}$–$1280^{th}$ pixels are stored in the fifth set.

In this architecture, it is also very easy to generate the address signals which are as follows:

CS = bit 9 to bit 11 of the x coordinate
RAS = y coordinate
CAS = first eight bits of the x coordinate.

Furthermore, this architecture also makes full use of all memory units. However, the linear address method can only access one address (i.e., one pixel) at a time. As the speed of VRAM is slow, it cannot meet the desired pixel rate of 9.5 ns/pixel. A solution to this problem is to add a temporary buffer between the frame buffer and the CRT controller (see FIG. 1) to compensate for the slow speed of the VRAMs and the high pixel rate required by the CRT controller. However, the use of the temporary buffer is a shortcoming of this architecture because it significantly adds to the overall system cost.

In view of the foregoing, it is an object of the present invention to provide an alternative memory architecture for the frame buffer of a high resolution graphics system. In particular, it is an object of the invention to provide a memory architecture which makes full use of available memory capacity, meets the desired pixel access speed, and requires only simple circuitry for the generation of address signals.

More specifically, it is an object of the present invention to provide a divide-by-five circuit which can be used to implement such a memory architecture.

SUMMARY OF THE INVENTION

In accordance with the present invention, a divide-by-five circuit is provided for a frame buffer of a high resolution graphics system which comprises five sets of VRAMs.

The use of five sets of VRAMs is especially useful in the case of 1280*1024 pixel display. Note that 1280*1024 can be rewritten as 5*256*1024. This means that a frame buffer of a 1280*1024 pixel display can be implemented with five sets of VRAMs each having 256K addresses. Thus, depending on how many bits-/pixels there are in the display, each VRAM set can be implemented using one or more 256K*4 VRAMs.

In accordance with the present invention, pixels corresponding to display location x,y have an address location in the frame buffer which can be accessed by the following address signals CS = x mod 5
RAS = y/2
CAS = $y_0$*256 + x/5.

Conventionally, it has been difficult to generate these address signals because division by a five is difficult to implement. Thus, a frame buffer with this architecture and address scheme has not been realized.

In contrast, the memory architecture of the present invention includes an address generator with a unique divide-by five circuit wherein the division is carried out by a sequence of additions and multiplications.

This architecture has several significant advantages. In particular, the memory capacity is utilized fully, and the VRAM sets can be accessed in parallel so that five pixels can be read out at one time to satisfy the 9.5 ns/pixel access time requirement.

DETAILED DESCRIPTION OF THE INVENTION

Figure 5:
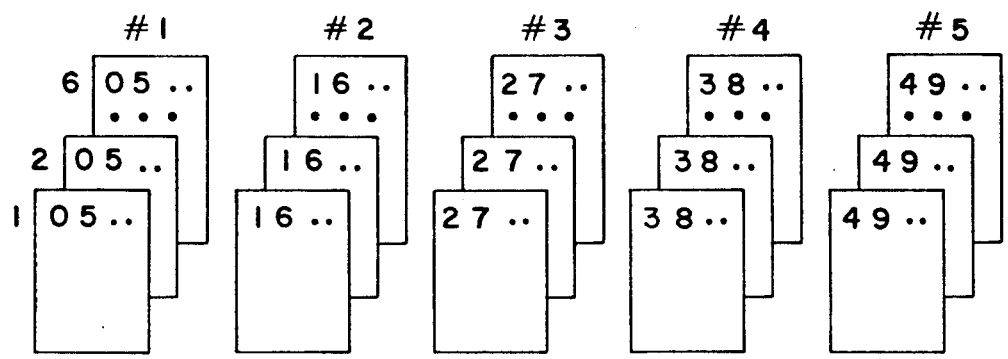
FIG. 5 illustrates a frame buffer architecture in accordance with the present invention.

FIG. 5 illustrates a frame buffer architecture comprising five sets of VRAMs. Pixels having coordinates x,y in the display 12 of FIG. 1 may be located in the frame buffer of FIG. 5 with the address signals.

CS (VRAM set select) = x mod 5
RAS (row address) = y/2
CAS (column address) = $y_0$*256 + x/5.

FIG. 5 shows how the pixels from one display row are organized in the five VRAM sets.

Figure 1:
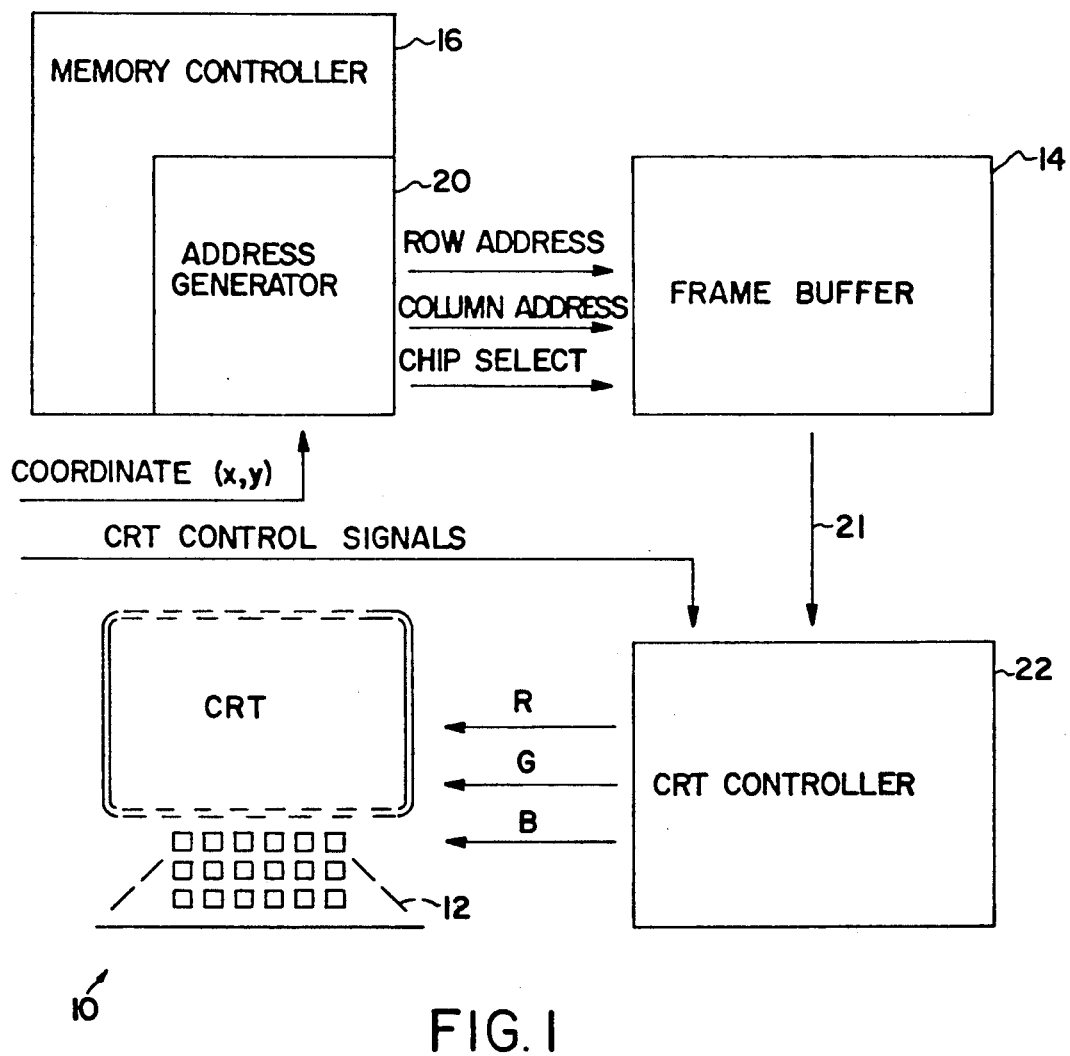
FIG. 1 schematically illustrates a graphics system.
Figure 2:
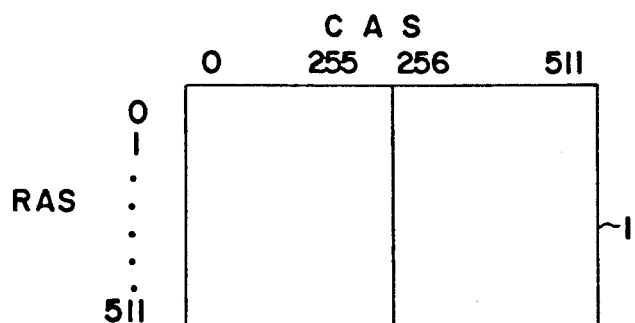
FIG. 2 schematically illustrates a 256K VRAM.
Figure 3:
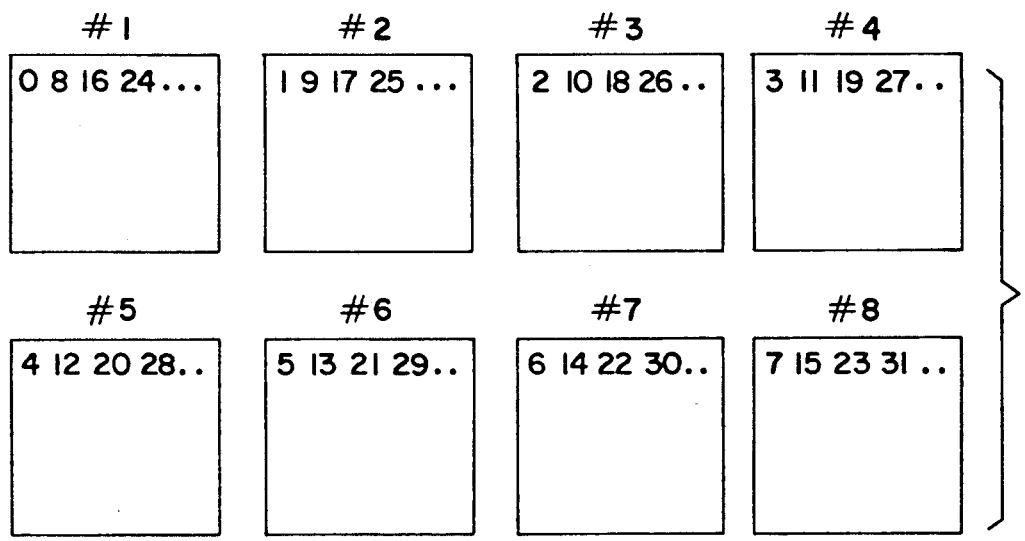
FIG. 3 illustrates a first conventional frame buffer architecture.
Figure 4:
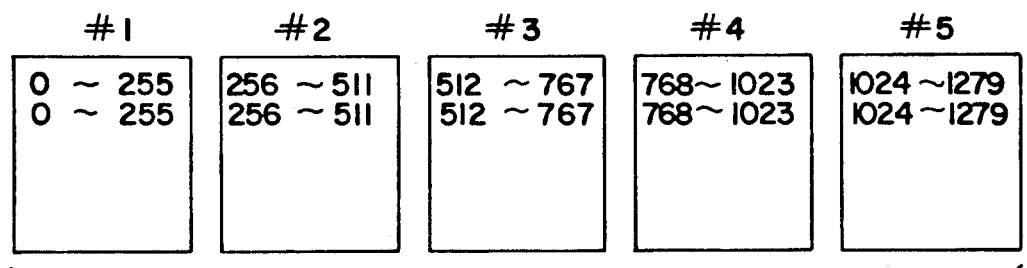
FIG. 4 illustrates a second conventional frame buffer architecture.
Figure 6:
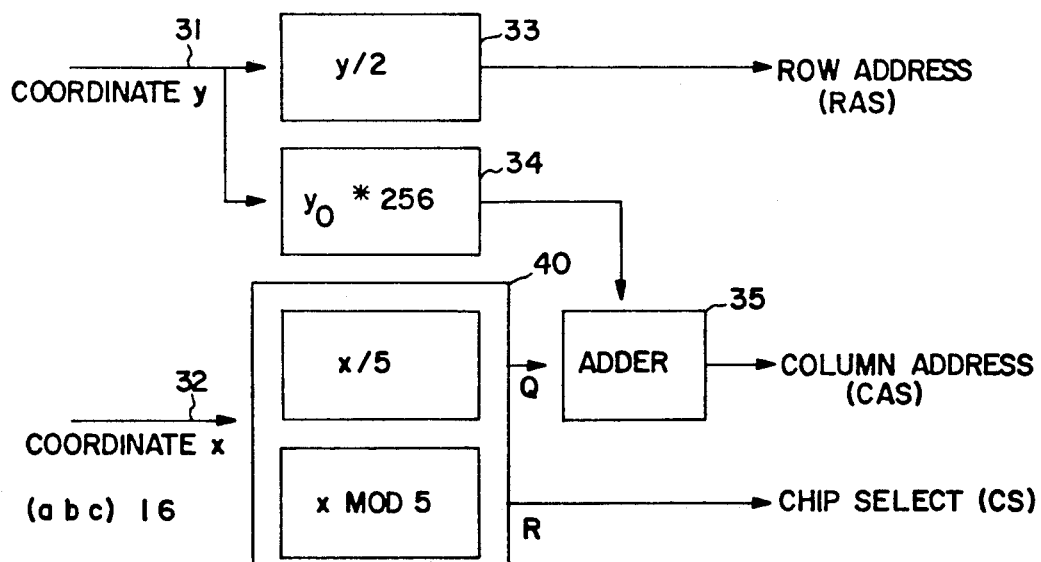
FIG. 6 schematically illustrates an address generator circuit for use with a frame buffer in accordance with the present invention.

FIG. 6 illustrates an address generator circuit 20 in accordance with the present invention for use with frame buffer architecture of FIG. 1. The address generator circuit 20 has a first input 31 for receiving a signal representative of a y coordinate of a pixel on a display screen. The address generator circuit 20 has a second input 32 for receiving the x coordinate of the pixel on the display screen. The y coordinate is fed to a divide-by-two divider 33 which outputs the row address signal RAS. The divide-by-two operation is easily implemented by a one bit right shift.

The address generator 20 also includes a divide-by-five circuit 40. The divide-by-five circuit 40 receives a signal representing the x coordinate as an input and outputs a quotient Q = x/5 and a residue R = x mod 5. The residue R is the chip select signal CS.

The zero bit of the y coordinate is multiplied by 256 in the multiplier 34. This multiplier can be implemented using an eight-bit shift left. An adder 35 adds Q + $y_0$*256 to output the column address CAS.

The circuitry utilized to carry out the x mod 5 and the x/5 operations is discussed in detail below.

While division by a power of two can be accomplished by simple shifting operations, division by a prime number other than two is considerably more difficult. One way to divide a number x with m bits by a prime number q is as follows. The number x can be represented as $$x = C_i(2^p)^i + C_{i-1}(2^p)^{i-1} + \ldots + C_0 \quad (1)$$

In this case x/q can be represented as $$x/q = C_i * A_i + C_{i-1} * A_{i-1} + \ldots + C_0 * A_0 + z/q \quad (2)$$

where p is an integer
$0 \leq C_i \leq 2^p - 1$
i is an index that takes on the values 0,1 up to approximately m/p
$A_i$ is a predetermined constant
$z/q = f(C_i, C_{i-1}, \ldots C_0)$ Using this formulation, the division has been converted into a sequence of multiplications and additions. The division z/q is easy to perform with a Knauph map because it contains very few bits.

Consider the case of the 1280*1024 display. In this case, the x coordinate is an 11 bit value. The divisor q is 5. The value for p can be chosen to be four and the number x can be represented as follows:

$$\begin{aligned} x &= a(16)^2 + b(16) + c \\ &= a*256 + b*16 + c \end{aligned} \quad (3)$$

Together $(abc)_{16}$ form the hexadecimal representation of x, where $a = a_2a_1a_0$ is a three bit value, $b = b_3b_2b_1b_0$ is a four bit value, and $c = c_3c_2c_1c_0$ is a four bit value. The representation of x in equation (3) can be rewritten as $$\begin{aligned} x &= a*255 + b*15 + (a+b+c) \\ &= (51*a + 3*b)5 + (a+b+c) \end{aligned} \quad (4)$$

Therefore the quotient x/5 can be expressed as $$\begin{aligned} Q = x/5 &= 51*a + 3*b + (a+b+c)/5 \\ &= 32a + 16a + 3X + (X+c)/5 \\ &= 32a + 16a + 3X + Z \end{aligned} \quad (5)$$

where
$K = a + b$ is a five bit value $X_4X_3X_2X_1X_0$, and $Z = (X + c)/5$ is a three bit value $Z_2Z_1Z_0$ The division $(X+c)/5 = Z$ is easy to perform because the dividend has only 4-6 bits.

The sum of equation (5) can be represented as $$
\begin{array}{cccccccc}
a_2 & a_1 & a_0 & 0 & 0 & 0 & 0 & 0 \\
0 & a_2 & a_1 & a_0 & 0 & 0 & 0 & 0 \\
 & & X_4 & X_3 & X_2 & X_1 & X_0 & 0 \\
 & & 0 & X_4 & X_3 & X_2 & X_1 & X_0 \\
 & & & & & Z_2 & Z_1 & Z_0 \\
\hline
Q_7 & Q_6 & Q_5 & Q_4 & Q_3 & Q_2 & Q_1 & Q_0
\end{array}
\quad (6)
$$

Figure 7:
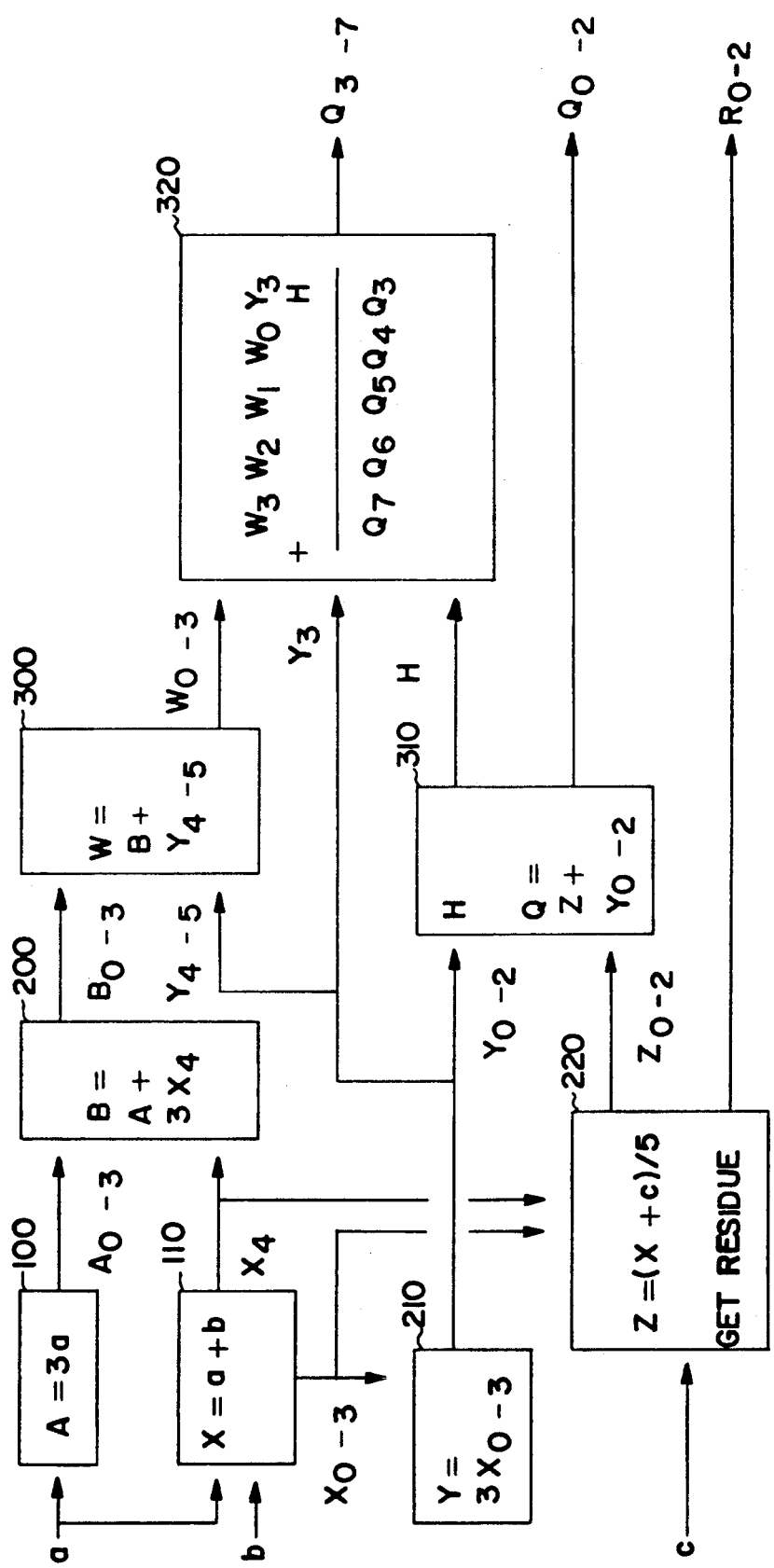
FIG. 7 illustrates a divide-by-five circuit for use in the address generator of FIG. 6.

FIG. 7 schematically illustrates a circuit 40 for performing the summation of equation 6 to obtain the eight bit quotient $x/5 = Q = Q_7Q_6Q_5Q_4Q_3Q_2Q_1Q_0 = Q_{0-7}$ and three bit residue $R = R_2R_1R_0 = R_{0-2} = x \bmod 5$. The circuit 40 comprises three stages. A first stage comprises the circuits 100 and 110. A second stage comprises the circuits 200, 210, and 220. A third stage comprises the circuits 300, 310, 320.

The circuit 100 performs the multiplication $A = 3a$ by performing the addition $$
\begin{array}{cccc}
a_2 & a_1 & a_0 & 0 \\
0 & a_2 & a_1 & a_0 \\
\hline
A_3 & A_2 & A_1 & A_0
\end{array}
$$

where A is a four bit quantity represented as $A_3A_2A_1A_0 = A_{0-3}$.

The circuit 110 performs the addition $X = a + b$ as follows $$
\begin{array}{ccccc}
 & a_2 & a_1 & a_0 \\
b_3 & b_2 & b_1 & b_0 \\
\hline
X_4 & X_3 & X_2 & X_1 & X_0
\end{array}
$$

where $X = X_4X_3X_2X_1X_0 = X_{0-4}$ is a five bit quantity.

Thus, after processing by the circuits 100 and 110 the summation of equation (6) becomes $$
\begin{array}{cccccccc}
A_3 & A_2 & A_1 & A_0 & 0 & 0 & 0 & 0 \\
 & X_4 & X_3 & X_2 & X_1 & X_0 & 0 \\
 & & X_4 & X_3 & X_2 & X_1 & X_0 \\
 & & & & Z_2 & Z_1 & Z_0 \\
\hline
Q_7 & Q_6 & Q_5 & Q_4 & Q_3 & Q_2 & Q_1 & Q_0
\end{array}
\quad (7)
$$

In the second stage, the circuit 210 performs the multiplication $Y = 3 * X_{0-3}$ as follows:

$$
\begin{array}{ccccc}
X_3 & X_2 & X_1 & X_0 & 0 \\
 & X_3 & X_2 & X_1 & X_0 \\
\hline
Y_5 & Y_4 & Y_3 & Y_2 & Y_1 & Y_0
\end{array}
$$

where $Y = Y_5Y_4Y_3Y_2Y_1Y_0 = Y_{0-5}$ is a six bit quantity.

The circuit 200 performs the operation $B = A + 3 * X_4$ as follows $$
\begin{array}{cccc}
A_3 & A_2 & A_1 & A_0 \\
 & & X_4 & 0 \\
 & & 0 & X_4 \\
\hline
B_3 & B_2 & B_1 & B_0
\end{array}
$$

where $B = B_3B_2B_1B_0 = B_{0-3}$ is a four bit quantity. The circuit 220 performs the division $(X+c)/5 = Z = Z_2Z_1Z_0 = Z_{0-2}$ and also obtains the residue $R = R_2R_1R_0 = R_{0-2} = x \bmod 5$. A detailed discussion of how the circuit 220 operates is found below.

As a result of the processing by the circuits 200, 210 and 220, the summation of equation (7) may be written as follows $$
\begin{array}{cccccccc}
B_3 & B_2 & B_1 & B_0 & 0 & 0 & 0 & 0 \\
 & Y_5 & Y_4 & Y_3 & Y_2 & Y_1 & Y_0 \\
 & & & & Z_2 & Z_1 & Z_0 \\
\hline
Q_7 & Q_6 & Q_5 & Q_4 & Q_3 & Q_2 & Q_1 & Q_0
\end{array}
\quad (8)
$$

In the third stage, the circuit 300 performs the addition $W = B + Y_{4-5}$ as follows $$
\begin{array}{cccc}
B_3 & B_2 & B_1 & B_0 \\
 & & Y_5 & Y_4 \\
\hline
W_3 & W_2 & W_1 & W_0
\end{array}
$$

where $W = W_3W_2W_1W_0 = W_{0-3}$ is a four bit quantity. The circuit 310 performs the addition $Y_{0-2} + Z = Q_{0-2} = Q_2Q_1Q_0$ as follows $$
\begin{array}{ccc}
Y_2 & Y_1 & Y_0 \\
Z_2 & Z_1 & Z_0 \\
\hline
H & Q_2 & Q_1 & Q_0
\end{array}
$$

where H is a carry bit.

The circuit 320 performs the addition $$
\begin{array}{ccccc}
W_3 & W_2 & W_1 & W_0 & 0 \\
 & & & Y_3 \\
 & & & H \\
\hline
Q_7 & Q_6 & Q_5 & Q_4
\end{array}
$$

In this manner the circuit 40 of FIG. 7 obtains the quotient $Q = Q_7Q_6Q_5Q_4Q_3Q_2Q_1Q_0 = x/5$ and the residue $R = R_2R_1R_0 = x \bmod 5$.

The circuit 220 of FIG. 7 which performs the division $(X+c)/5$ and generates as outputs $Z_2Z_1Z_0$ and $R_2R_1R_0$ is now considered in greater detail.

Figure 8A:
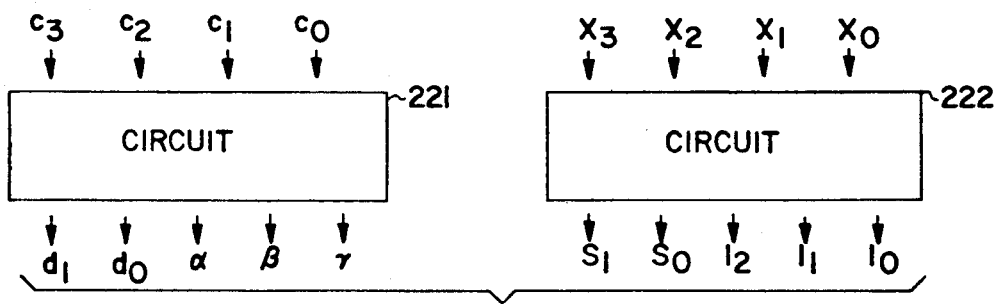
FIGS. 8a-8f illustrates a circuit for use with the divide-by-five circuit of FIG. 7.

The circuit 220 of FIG. 7 comprises six stages. The first stage is illustrated in FIG. 8a and comprises the circuits 221 and 222. The circuit 221 receives the inputs $c_3c_2c_1c_0$ and outputs a two bit quantity $d = d_1d_0 = c/5$ and a three bit quantity $\alpha\beta\gamma = c \bmod 5$. The circuit 222 of FIG. 8a receives the quantity $X_3X_2X_1X_0$ and divides this quantity by five to output a two bit quantity $S_2S_0$ and obtains the value of $X_3X_2X_1X_0 \bmod 5$ and outputs a three bit quantity $l_2l_1l_0$ corresponding thereto.

Figures 8B, 8C:
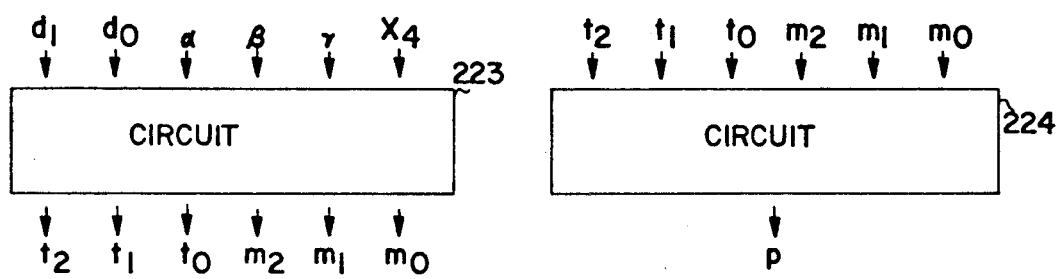

The second stage illustrated in FIG. 8b comprises the circuit 223. The circuit 223 receives the inputs $d_1d_0$, $\alpha\beta\gamma$, and $X_4$. The outputs are as follows if $X_4 = 1$,
 $m = m_2m_1m_0 = (\alpha\beta\gamma + 1) \bmod 5$
 $t = t_2t_1t_0 = d_1d_0 + (\alpha\beta\alpha + 1)/5 + 3$
if $X_4 \neq 1$
 $m = \alpha\beta\gamma$
 $t = d$.

The third stage is illustrated in FIG. 8c and comprises the circuit 224. The circuit 224 receives as inputs $l_2l_1l_0$ and $m_2m_1m_0$ and outputs p, where
 $p = 1$ if $l + m \geq 5$.

Figures 8D, 8E:
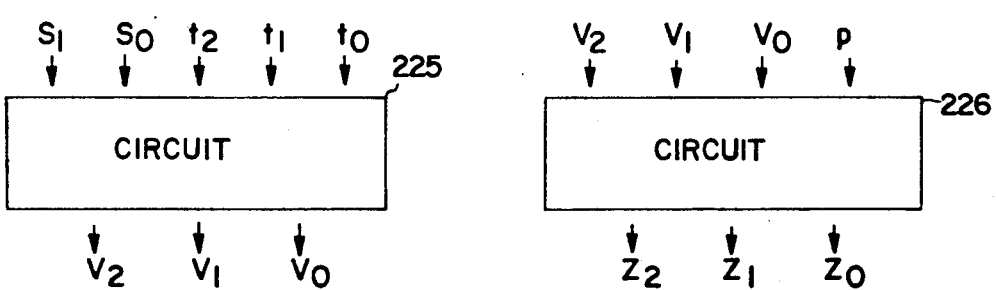

The fourth stage is illustrated in FIG. 8d and comprises the circuit 225. The circuit 225 receives as inputs $S_1S_0$ and $t_2t_1t_2$ and sums these values to generate $V_2V_1V_0$.

The fifth stage is illustrated in FIG. 8e and comprises the circuit 226. The circuit 226 adds $V_2V_1V_0$ and the overflow bit P to obtain the value $Z = Z_2Z_1Z_0$.

Figure 8F:
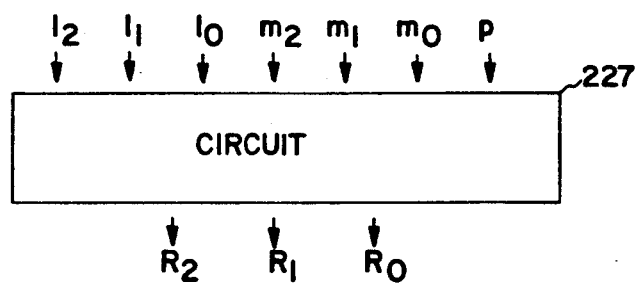

The sixth sage is illustrated in FIG. 8f and comprises the circuit 227. The circuit 227 receives the inputs $l_2l_1l_0$, $m_2m_1m_0$, and p and outputs the residue $R_2R_1R_0$.

In short, a memory architecture for a frame buffer of a graphics system has been disclosed. The frame buffer comprises five sets of one or more VRAMs. The generation of address signals for the frame buffer requires divide-by-five operations. Accordingly, the address generator includes a unique divide-by-five circuit wherein divide-by-five operations are carried out by a sequence of multiplications and additions. In comparison to conventional systems, the system of the present invention makes more efficient use of capacity in the frame buffer. Finally, the above-described embodiments of the invention are intended to be illustrative only. Numerous alternative embodiments may be devised by those skilled in the art without departing from the spirit and scope of the following claims.

We claim:

1. A divider circuit for dividing an eleven bit number x having a hexadecimal representation $(abc)_{16}$ by five, where a is a three bit quantity, b is a four bit quantity and c is a four bit quantity, said divider circuit comprising a first stage comprising a first circuit for determining $A=3*a$ and a second circuit for determining $X=(a+b)$ where A is a four bit value and X is a five bit value, a second stage connected to said first stage comprising a third circuit for determining $Y=3*X$ where Y is a six bit value, a fourth circuit for determining $B=A+3X_4$ where B is a four bit value and $X_4$ is the fifth bit of X, and a fifth circuit for determining $Z=(X+c)/5$, where z is a three bit value, and for generating a residue R equal to x mod 5, and a third stage connected to said second stage comprising a sixth circuit for determining $W=B+Y_{4-5}$ where W is a four bit vale and $Y_{4-5}$ is the fifth and sixth bits of Y, a seventh circuit for determining $Y_{0-2}+Z=Q_{0-2}$ where $Y_{0-2}$ are the first, second and third bits of Y and $Q_{0-2}$ are the first, second and third bits of an eight bit quotient Q, and for determining a carry bit H, and an eight circuit for determining $Q_{3-7}=W_{0-3}+Y_3+H$ where $Q_{3-7}$ are the fourth through eight bits of the quotient Q, and $Y_3$ is the fourth bit of Y, said divider circuit forming part of an address generator for generating addresses for a frame buffer for a video display system.

* * * * *